United States Patent [19]

Chanzy et al.

[11] Patent Number: 4,769,433

[45] Date of Patent: Sep. 6, 1988

[54] HIGH STRENGTH POLYOLEFINS

[75] Inventors: Henri D. Chanzy, Isere, France; Bruno Rotzinger, Untersiggenthal, Switzerland; Paul Smith, Wilmington, Del.

[73] Assignee: E. I. Du Pont de Nemours and Company, Wilmington, Del.

[21] Appl. No.: 901,768

[22] Filed: Aug. 29, 1986

Related U.S. Application Data

[63] Continuation-in-part of Ser. No. 802,153, Nov. 25, 1985, abandoned, and a continuation-in-part of Ser. No. 692,410, Jan. 17, 1985, abandoned.

[51] Int. Cl.⁴ .................. C08F 10/02; D02J 1/22
[52] U.S. Cl. .................. 526/348.1; 526/351; 526/352; 264/164; 264/288.4; 264/290.5; 264/345; 528/502
[58] Field of Search .......... 264/164, 290.5, 345, 264/288.4; 526/348.1, 351, 352; 528/502, 503

[56] References Cited

U.S. PATENT DOCUMENTS

| | | | |
|---|---|---|---|
| 3,891,610 | 6/1975 | Fowells | 526/909 X |
| 3,922,257 | 11/1975 | Blunt et al. | 526/909 X |
| 4,012,342 | 3/1977 | Dougherty | 264/344 X |
| 4,276,348 | 6/1981 | Wu et al. | 428/373 |
| 4,344,908 | 8/1982 | Smith et al. | 264/203 |
| 4,348,350 | 9/1982 | Meier et al. | 264/570 |
| 4,356,138 | 10/1982 | Kavesh et al. | 264/164 |
| 4,385,026 | 5/1983 | Barham | 264/288.4 |
| 4,411,854 | 10/1983 | Maurer et al. | 264/205 |
| 4,422,993 | 12/1983 | Smith et al. | 264/210.8 |
| 4,430,383 | 2/1984 | Smith et al. | 428/364 |
| 4,436,689 | 3/1984 | Smith et al. | 264/204 |

OTHER PUBLICATIONS

Chanzy et al., Polym. Comm., vol. 26, (1985), pp. 258–260, "Drawing of Virgin UHMWPE:An Alternative Route to High Strength Fibres".
Capaccio et al., Polymer, 1976, vol. 17, p. 644.
Jarecki et al., Polymer, 1979, vol. 20, p. 1078, "Ultrahigh Modulus PE I".
Wu et al., Polym. Eng. Sci., 1979, vol. 19, (16), p. 1163, "High-Strength Polyethylene".
Truss et al., Polym. Eng. Sci., 1980, vol. 20, p. 747, "Cold Compaction Molding and Sintering of UHMWPE".
Smith et al., J. Polym. Sci. Polym. Phys. Ed., vol. 19, 877–888, (1981).
Smith et al., J. Mat. Sci., vol. 15, 505–514, (1980).
Jarecki et al., J. Polym. Sci. Polym. Phys. Ed., vol. 17, 1611–1621, (1979), "Ultrahigh Modulus PE II".
Chanzy et al., Polymer, vol. 8, 567, (1967).

*Primary Examiner*—Joseph L. Schofer
*Assistant Examiner*—F. M. Teskin

[57] ABSTRACT

High strength, substantially linear, highly crystalline, high molecular weight-polyolefin shaped structure having a tenacity of greater than 15 g/den and an initial modulus of greater than 500 g/den by drawing never-processed polyolefin at a temperature of 60° C. to 145° C.; and processes for making never-processed polyolefin and such shaped structures.

5 Claims, No Drawings

HIGH STRENGTH POLYOLEFINS

CROSS REFERENCE TO RELATED APPLICATIONS

This application is a continuation-in-part of application Ser. No. 802,153 filed Nov. 25, 1985 as a continuation-in-part of application Ser. No. 692,410 filed Jan. 17, 1985, both now abandoned.

BACKGROUND OF THE INVENTION

1. Field of the Invention

This invention relates to the production of high strength films, tapes, fibers and filaments from never-processed high molecular weight polyolefins. More specifically, it relates to the production of ultra high molecular weight (greater than $1 \times 10^6$) polyolefin which can be compression moulded below its melting point and thereafter drawn to draw ratios greater than 18:1 to produce high strength films, tapes, fibers and filaments.

2. Background

Polyolefin fibers of high strength and high modulus can only be prepared by additional processing of the virgin polymers. For example, polyolefin fibers of high strength and high modulus can be prepared by melt-spinning and subsequent tensile drawing. Wu and Black, Polym. Eng. Sci., 19, 1163 (1979), and U.S. Pat. No. 4,276,348 disclose the preparation of polyethylene filaments having a tensile strength of 19 g/den. Filaments of higher strength usually cannot be prepared by the method of melt-spinning. The use of higher molecular weight polymers ($\overline{M}_w > 300,000$) may provide higher strength filaments, but such polymers are difficult to process from the melt.

Polyolefin fibers having tensile strengths of more than 20 g/den are commonly produced only from solution. High molecular weight polymer ($\overline{M}_w > 800,000$) is dissolved in a suitable solvent to a concentration of 1–15%, by weight; the solution is then spun and cooled to form gel fibers which are either extracted, dried and drawn, or directly drawn to a draw ratio of 20 or more. Conventional draw procedures are used, such as disclosed in U.S. Pat. Nos. 4,344,908; 4,411,854; 4,422,993; 4,430,383; and 4,436,689 and in European Patent Application Publication No. 0 064 167. Such processes require the technologically difficult dissolution of high molecular weight polymer, and are frequently accompanied by mechanical degradation of the macromolecules, the latter having a negative effect on the final tenacity. The solution spinning route to high strength filaments also requires the evaporation of the spinning solvent, or extraction and drying, a tedious and costly operation.

Polyolefin films have been prepared and described by Chanzy et al., Kolloid-Z.u.Z. Polymer, 251, 563 (1973). Polyolefin films having an unusually high melting temperature and crystallinity have been described by Chanzy et al., Colloid & Polym. Sci., 252, 8–14 (1974). These publications do not disclose or suggest the hot-drawing of the films, and highly drawn films with high modulus and high tenacity are neither disclosed nor suggested. Chanzy et al., Polymer, 8, 567 (1967), discuss the morphological changes which occur during the stretching of a strip of virgin polyethylene, referred to as "nascent polyethylene". No highly oriented structures with high tenacity and high modulus are disclosed or suggested, and the strips can be drawn only to a draw ratio of about 2:1 at 25° C. (room temperature) without breakage. Drawing at elevated temperatures is neither disclosed nor suggested.

Truss et al., Poly. Eng. Sci., 20(11), 747–755 (1980), disclose that ultra high molecular weight polyethylene [MW 1,000,000 to 5,000,000] can be fabricated from powder by cold compaction and sintering, provided polymer with a suitable size and morphology is used and the sintering is done at or above the melting point of the polymer. When sintering was conducted below the melting point of the polymer, the resultant samples had low density and tensile strength.

It is an object of this invention to provide an economical process for the preparation of polyolefin films, tapes, fibers and filaments which have a high modulus and high strength directly from the virgin polymer without the need for additional processing. Another object is to provide highly deformed films, tapes, fibers and filaments of polyolefins. Another object of this invention is to provide a process for the production of ultra high molecular weight polyolefin which can be compression moulded below the melting point of the polymer. Still another object is to provide compression moulded polyolefin which can be drawn to draw ratios greater than 15:1. A further object is to provide polyolefin films, tapes, fibers and filaments having tenacities greater than 15 g/den and initial moduli greater than 500 g/den. These and other objects will become apparent from the following description.

DETAILED DESCRIPTION OF THE INVENTION

In the present invention virgin polyolefins are hot drawn into films, tapes, fibers and filaments having tenacities of more than 15 g/den and initial moduli of more than 500 g/den. More specifically, the invention resides in a process for producing shaped structures having a tenacity of greater than 15 g/den and an initial modulus of greater than 500 g/den, said process comprising drawing at 60°–145° C., at a draw ratio of at least 15:1, a substantially linear, highly crystalline, high molecular weight, never-processed polyolefin selected from polyethylene, polypropylene and copolymers of ethylene and 0.1–2.0 mol % propylene. At the upper end of the temperature range, a draw ratio of $\geq 40:1$ can be achieved. The invention also resides in the shaped structures thus produced.

The term "shaped structure" includes any form obtained by carrying out a shaping process on the polyolefin. Shaped structures which are provided by this invention include films, tapes, fibers and filaments.

The key to the invention is the discovery that virgin, that is, never-processed (neither melted nor dissolved), polyolefins that are produced at relatively low polymerization temperatures can be drawn to extremely high draw ratios (greater than 18:1). On the other hand, with conventional melt-processed high molecular weight polyolefins, the maximum draw ratio below the melting point of the polymer rapidly decreases with increasing molecular weight. For example, melt processed polyethylene of $\overline{M}_w$ 5,000,000 can be drawn at 120° C. to a draw ratio of only 6:1. Enhancement of the maximum draw ratio, which is beneficial for the extension and alignment of the polymer molecules and for improving its mechanical properties, is believed to be possible only through spinning from solution.

Surprisingly, it has been discovered that polyethylene of $\overline{M}_w$ 5,000,000, produced by polymerizing ethylene at low temperatures, can be drawn at 120° C. to a draw ratio of at least 20:1, and at high stretching rates. However, if the polymerization is carried out at high temperatures, for example, above 120° C., the maximum draw ratio of the as-produced polymer can be, as noted above, as low as 6:1 at 120° C.

A further key to this invention resides in the discovery that ultra high molecular weight polyolefin with a very low concentration of chain entanglements, as prepared herein, can be compression moulded and extruded below the melting temperature of the polymer into mechanically coherent structures, and that such structures can be drawn to extremely high draw ratios of greater than 18:1 to produce fibers, filaments, tapes and films having tenacities greater than 15 g/den and an initial modulus greater than 500 g/den. The preferred compression moulding or extrusion temperature is greater than 1° C. below the melting point of the polymer, more preferably greater than 2° C. below the melting point of the polymer, and most preferably greater than 3° C. below the melting point of the polymer.

Conventional ultra high molecular weight polyolefins processed below their melting temperatures exhibit weak mechanical integrity and cannot be drawn to high draw ratios. Melt-processable high molecular weight polyolefins have good mechanical coherence but cannot be drawn to high draw ratios.

In the present invention the polymerization of the olefin must be carried out in such manner that the temperature of the surface of the polymer does not exceed 90° C. This upper limit is necessary to avoid dissolving or melting the polymer, either of which would result in the formation of a high concentration of chain entanglements. Since the surface temperature cannot be measured directly, we have defined bulk temperature and vanadium (III) concentrations for the catalyst system $Al^{+3}/V^{+3}$ which allow one to achieve the desired result of this invention. With a homogeneous catalyst at vanadium (III) reaction mixture concentrations of 0.00002-0.00004M, the operable polymerization temperature range is −40° C. to 20° C.; at vanadium (III) concentrations of 0.000001 to 0.00002M, the operable temperature range is 20° C. to 60° C.

Other known catalysts, for example, of the Ziegler-Natta or Phillips type, used for the preparation of linear highly crystalline polyolefins can be used in the production of the polyolefins of this invention as long as the combination of concentration and activity of the catalyst and the bulk temperature are such that the surface temperature of the polymer does not exceed 90° C.

Some general rules for the effect of the polymerization conditions, such as the concentration of active sites on the catalyst and the monomer pressure, on the localized polymer chain temperature are given below and are illustrated in the examples which are illustrative of this invention. An increased number of active sites on the catalyst increases the amount of heat generated during the polymerization, thus having an adverse effect on the elongation (drawing) properties of the final polymer. Analogously, a high polymerization pressure leads to a decreased stretchability (drawability) of the polymer. Low reaction rates, i.e. relatively low monomer pressures (15 psig or less), low bulk polymerization temperatures, "slow" catalyst systems (that is, with few active sites) are preferred. All polymerization conditions play an interlocking role and the optimum temperature and pressure depend on the catalyst system selected. Following the above recommendations, the worker skilled in the art of polymerization can readily adjust the experimental conditions to obtain the high elongations (drawability) of the polymers of this invention.

The polyolefin of this invention is substantially linear, highly crystalline and of high molecular weight. Ethylene and propylene are the preferred monomers, with ethylene being more preferred. At most, 0.1 to 2.0 mole percent of a higher alpha-olefin, preferably propylene, can be copolymerized with the ethylene. Preferably, such a copolymer which is produced should have an average of less than one side chain per 100 carbon atoms, more preferably less than one side chain per 500 carbon atoms. The homopolymers polyethylene and polypropylene are the preferred polyolefins; of these, polyethylene is preferred. The polyolefin of this invention has a molecular weight ($\overline{M}_w$) of greater than one million, preferably at least two million, and more preferably at least five million. Thus, this invention provides a means of processing polyolefins of extremely high molecular weight and crystallinity not heretofore possible with conventionally-obtained polyolefins of comparable molecular weight and crystallinity.

As disclosed above, the catalyst employed for the polymerization can be of the conventional type used to prepare linear highly crystalline polyolefins, such as catalysts of the Ziegler-Natta or Phillips type. It is of great importance that the polymerization be carried out such that the vessel temperature and, more importantly, the local temperature of the growing polymer chains, be not higher than 90° C. This upper limit for the local temperature of the growing polymer chain is based on the presumption that, at higher temperatures, the growing polymer chain may be soluble in the ethylene phase, in which case it would be outside the aforesaid definition of "never-processed", that is, neither melted nor dissolved. There presently are no known methods for measuring the temperature of a growing polymer chain. Polymer produced at higher temperatures can readily be distinguished from the requisite polymer of this invention in that the latter is typified by an unusually high crystallinity, heat of fusion and melting point. Typical values of the crystalline content, heat of fusion and melting point for commonly available polyethylenes are 60%, 170 Joules/gram and 135° C., respectively, although slightly higher values sometimes can be obtained. Corresponding typical values of the polyethylene requisite to this invention are 75%, 220 Joules/gram and 140° C., although values as high as 82% crystallinity, 239 Joules/gram heat of fusion and 142° C. melting point have been obtained herein. Measurement of these physical properties, therefore, provides a suitable means for determining the operability of the polyolefin in this invention. The melting point and heat of fusion can be determined routinely by means of differential scanning calorimetry (DSC). The values quoted herein were obtained at a heating rate of 10° C./minute. The use of higher heating rates may give slightly higher melting points, due to the "superheating" effects known to be associated with thermal analysis of highly crystalline polymers. The crystalline content can be determined by standard density, infrared and X-ray measurements, or it can be derived from the heat of fusion.

According to this invention, polyolefin filaments, tapes, fibers and films with a high tenacity and a high modulus can be prepared. These properties were measured herein under standard conditions on an Instron tensile tester. The testing temperature was 23° C., the sample length was 1 inch (2.54 cm) and the elongation rate during the test was 1 inch (2.54 cm)/minute. The modulus values given below are the initial moduli.

To obtain the high modulus values required, drawing of the virgin polymer must be performed in such a way that the maximum effective draw ratio is obtained. Generally, this means that drawing is performed at elevated temperatures, where the mobility of the macromolecules is increased. The temperature, on the other hand, should not be so high that the polymer is completely molten and the relaxation of the macromolecules is too rapid. Typically, drawing is carried out at 60°-145° C. and preferably at 120°-145° C. Since the polyolefins used in this invention have a high melting point, the drawing can thus be carried out at higher temperatures than for commonly processed polyolefins. For example, drawing at temperatures as high as 145° C. still has produced excellent fibers and films. Drawing at temperatures above 150° C., however, is not recommended.

There are very clear differences between the shaped structures made according to the current invention and, for example, those made by casting or spinning from solution. The most notable difference is that, in the present invention, the polymer is never dissolved or melted. The fact that the polymer has never been in the liquid state gives it its unique high draw ratio characteristics. The observation that the once molten polymer loses its high draw ratio potential corroborates this view. The most important advantage of the present invention is that once the polymer is produced, high strength and high modulus films and fibers can be obtained directly without elaborate spinning, casting techniques, dissolution, precipitation, extraction and drying. Finally, the current invention permits the production of films, tapes, fibers and filaments of polymers having extra-ordinarily high molecular weights, beneficial for achieving excellent creep properties. By contrast, polymers with extremely high molecular weights, for example, $>5,000,000$, are very difficult to process and shape using common techniques, particularly those involving solution processes wherein polymer solubility is limited and mechanical degradation usually occurs during mixing.

The fibers, tapes, filaments and films obtained by means of this invention are suitable for a wide variety of applications. They can be used as reinforcements in various materials, such as polymers and concrete. The filaments can be used for tire cords and rope, filter cloths and, more generally, for all applications in which high strength is desired in combination with low weight and excellent chemical resistance. The films and tapes produced according to the invention can readily be split and bundled into yarn.

Following is a description of a typical preparatory processes for polyolefin used in this invention. In Examples 1-4 a thin layer of $VCl_3$ catalyst crystals was deposited on glass slides by treating them with a refluxing 1 millimolar solution of $VCl_4$ in heptane. Subsequently, the $VCl_3$-coated slides were placed in a saturated solution of ethylene in heptane. Then, a solution of $Al[C_2H_5]_3$ in heptane was added at room temperature so that the mixture contained 6 millimoles of $Al[C_2H_5]_3$. After a few minutes a coherent film of virgin polyethylene of high molecular weight was produced on each slide.

In Examples 5-38 the polymer was prepared by bulk polymerization and formed for drawing by compression molding.

The invention will be demonstrated by, but not limited to, the following examples. Also provided along with the examples are comparative experiments which demonstrate the preparation of polyolefin which is outside the invention because the polymerization conditions were not selected in accordance with the general rules outlined hereinabove.

EXAMPLE 1

Five glass slides, each $75 \times 50$ mm, were cleaned with dilute HF, rinsed with distilled water, dried and inserted into a dry-box. Freshly distilled $VCl_4$ (0.8 mmole) was added to a one liter reactor filled with dry n-heptane. The solution was heated to boiling. The slides were immersed in the boiling liquid and kept there for 10 minutes. During that time $VCl_3$-crystals were generated and deposited onto the surface of the glass-slides. The slides were then withdrawn from the reactor and thoroughly washed with n-heptane. The slides were inserted into a one liter polymerization reactor filled with a solution of 6 mM $Al[CH_2CH_3]_3$ in heptane. Stirring was initiated and ethylene was bubbled through the reactor. Polymerization started immediately and was continued for 5 h at ambient temperature. The slides were removed from the reactor and washed with ethanol. They were covered with a 25 $\mu$m thick film of polyethylene.

The intrinsic viscosity of the polymer, determined according to standard procedures at 135° C. in decalin, was 25 dl/g, which corresponds to a $\overline{M}_w$ of 5,000,000 (P. S. Francis, R. Cooke, Jr. and J. H. Elliott, J. Polymer Sci. 31, 453 (1957)).

The heat of fusion was determined by differential scanning calorimetry (DSC). A sample of 4 mg was heated at a rate of 10° C./minute from room temperature to 200° C. The DSC melting chart showed an endotherm with a maximum peak temperature of 141.5° C. The heat of fusion, determined from the endotherm-area, was 226.4 Joules/g. The latter value corresponds to a crystallinity of 78%, based on 290 Joules/g for 100% crystalline material.

In a second experiment the once-molten and cooled sample was heated in the DSC at the same heating rate of 10° C./minute. The heat of fusion of this sample was only 121.9 Joules/g and the melting peak temperature was 134° C. This experiment shows the deleterious effect caused by melting of the polymer in the first DSC measurement.

The virgin polymer film was readily stripped from each glass slide. Strips of $20 \times 0.25$ mm were cut and stretched on a hot-shoe at various temperatures. At a temperature of 120° C. the maximum draw ratio was 20. At 130° C. the film could be drawn 30x at high stretching speeds of 5-30 times its original length in one second. The 30x-drawn strip was of 1.5 denier. The 1.5 denier filament was tested in the Instron tensile tester. The results were: tenacity, 26 g/den; initial modulus, 700 g/den; elongation to break, 4%.

EXAMPLE 2

A. A portion of the virgin film of Example 1 was pressed at 118° C. at 10,000 psi and subsequently cooled to 23° C. for 30 seconds. Strips cut from the pressed films were readily stretched to the same maximum draw ratios as in Example 1.

B. A portion of the virgin film of Example 1 was heated between hot plates at 180° C. Subsequently, the film was cooled down and stretched at 130° C. The maximum draw ratio of the film was only 5, showing the adverse effect of heating at 180° C. The mechanical properties of this film were: tenacity, 5 g/den; initial modulus, 90 g/den; elongation to break, 8%.

EXAMPLE 3

A. Example 1 was repeated. The polymerization time was 20 minutes and the thickness of the recovered film was about 5 μm. The intrinsic viscosity of the polymer was 21.4 dl/g. The films could readily be drawn at 130° C. to 30x their original length.

B. Part A was repeated with a polymerization time of 60 minutes. The film had a thickness of about 15 μm and the intrinsic viscosity of the polymer was 22.9 dl/g.

EXAMPLE 4

A. Example 1 was repeated using 3.6 mM Al[C(CH$_3$)$_3$]$_3$ in place of the 6 mM Al[CH$_2$CH$_3$]$_3$. The polymerization time was 5.5 h. The resulting polymer film had a thickness of 40 μm. The heat of fusion measured by DSC was determined to be 236 Joules/g, and the peak melting temperature was 143° C. The intrinsic viscosity was 27.3 dl/g.

B. Strips of the film of part A were cut and stretched at 130° C. and 135° C. The excellent mechanical properties of the stretched film samples are shown in Table I.

TABLE I

| Expt. | Stretch Temp. °C. | Filament Denier | Tenacity g/den | Modulus g/den | Elongation At Break (%) |
|---|---|---|---|---|---|
| B1 | 130 | 1.5 | 21.0 | 808 | 3.2 |
| B2 | 130 | 0.9 | 23.3 | 1294 | 2.2 |
| B3 | 130 | 0.8 | 26.2 | 1164 | 2.7 |
| B4 | 135 | 1.9 | 23.7 | 846 | 3.4 |
| B5 | 135 | 0.9 | 23.8 | 1082 | 2.5 |
| B6 | 135 | 1.4 | 26.6 | 1064 | 3.4 |

In the following examples, unless otherwise indicated, compression molding was conducted at about 500 kg/cm$^2$ and the properties of the drawn polymers were measured at 23° C. on drawn strips of varying initial widths (0.5–5.0 mm) which were cut from the molded films.

EXAMPLES 5–24

A. In an atmosphere of argon gas, a dry pressure bottle was charged with 150 ml of heptane and 50 ml of a 0.02M solution of diisobutylaluminum chloride in heptane. The contents were cooled to −20° C. and 50 ml of a 0.0002M solution of vanadium (III) acetylacetonate [V(CH$_3$COCHCOCH$_3$)$_3$] in heptane-toluene [90/10 V/V] was added. The bottle was sealed and pressurized with 10 psig of ethylene. After 16 hours at −20° C. and 10 psig ethylene the bottle was vented and the polymer recovered by filtration. The measured polyethylene was washed in methanol/hydrochloric acid, then with pure methanol and dried. The yield of dry polymer was 53.2 g. The polymer had a heat of fusion of 223 Joules/gram, a melting temperature of 142° C. (DSC at 10° C./minute) and an inherent viscosity of 26.7 dl/g (tetralin, 135° C.).

B. A portion of the polymer as above prepared in Part A was compression moulded into films at the various temperatures indicated in Table I under a pressure of about 500 kg/cm$^2$. Dumb-bell shaped tensile bars measuring 5 mm in width and 2.54 mm gauge length were cut from the pressed films and tested at room temperature without drawing. The results are given in Table II.

TABLE II

| Ex. | Temperature | Thickness | Modulus | Tenacity | Elongation |
|---|---|---|---|---|---|
| 5 | 25° C. | 0.59 mm | 5 g/den | 0.2 g/den | 12% |
| 6 | 50° C. | 0.53 mm | 6 g/den | 0.2 g/den | 50% |
| 7 | 70° C. | 0.33 mm | 9 g/den | 0.4 g/den | 308% |
| 8 | 80° C. | 0.43 mm | 10 g/den | 0.7 g/den | 690% |
| 9 | 90° C. | 0.43 mm | 11 g/den | 0.5 g/den | 220% |
| 10 | 100° C. | 0.46 mm | 9 g/den | 0.5 g/den | 690% |
| 11 | 120° C. | 0.26 mm | 13 g/den | 0.4 g/den | 440% |
| 12 | 134° C. | 0.23 mm | 14 g/den | 0.5 g/den | 175% |

C. Another portion of the polymer as prepared above in Part A was compression moulded into films at the temperatures indicated in Table III where the conditions employed to draw and the properties of the drawn polymers are also presented.

TABLE III

| Ex. | Molding Temperature (°C.) | Drawing Temperature (°C.) | Draw Ratio | Denier | Tenacity (g/den) | Modulus (g/den) | Elongation (%) |
|---|---|---|---|---|---|---|---|
| 13 | 100 | 130 | 40 | 46.8 | 30.1 | 1086 | 3.4 |
| 14 | 100 | 130 | 40 | 46.8 | 38.3 | 1394 | 3.3 |
| 15 | 100 | 100 | 40 | 180.0 | 33.2 | 1007 | 3.5 |
| 16 | 100 | 100 | 40 | 153.0 | 33.8 | 900 | 4.6 |
| 17 | 100 | 100 | 40 | 270.0 | 31.2 | 918 | 4.1 |
| 18 | 120 | 100 | 40 | 207.0 | 28.0 | 903 | 3.8 |
| 19 | 120 | 100 | 40 | 288.0 | 30.0 | 853 | 5.3 |
| 20 | 130 | 115 | 40 | 180.0 | 31.5 | 1049 | 3.8 |
| 21 | 130 | 115 | 40 | 270.0 | 30.5 | 876 | 4.1 |
| 22 | 133 | 125 | 25 | 405.0 | 21.6 | 635 | 4.1 |
| 23 | 133 | 125 | 25 | 370.0 | 25.7 | 714 | 4.4 |
| 24 | 133 | 125 | 25 | 280.0 | 27.3 | 720 | 5.0 |

COMPARATIVE EXPERIMENT A (outside the invention)

The commercially available ultra high molecular weight Hostalen Gur 415 (Hoechst; MW 5.0×10$^6$) was pressed at 500 kg/cm$^2$. Below 140° C. no coherent films were obtained. At 140° C. coherent films were obtained. A film of thickness 0.28 mm had a modulus of 13 g/den, tenacity 0.5 g/den and an elongation of only 16%.

COMPARATIVE EXPERIMENT B (outside the invention)

A. Ethylene was polymerized as described in Part A of Examples 5–24 except that the bulk polymerization temperature was 25° C. and the polymerization time was one hour. The yield of dry polymer was 11.1 g. The polymer had a heat of fusion of 212 Joules/gram, a melting temperature of 142° C. [DSC at 10° C./minute] and an inherent viscosity of 34.3 dl/g (tetralin, 135° C.); MW $6.9 \times 10^6$.

B. The polymer of Part A of this Comparative Experiment B was compression moulded at 120° C. Strips of different widths, typically about 0.5 or 5 mm, were cut from the films and stretched at a temperature of 130° C. to a draw ratio of 13. The mechanical properties of the drawn polymer were measured at 23° C. Denier 55.8 tenacity 8.9 g/den, modulus 288 g/den, elongation 3.3%.

EXAMPLE 25

A. Ethylene was polymerized as described in Example 5 except that a reaction temperature of 60° C., a reaction time of one hour and a vanadium concentration of 0.0001M was employed. Approximately 0.6 g of dry polymer having a heat of fusion of 209 Joules/gram, a melting temperature of 138° C. (DSC at 10° C./minute) and an inherent viscosity of 20.4 dl/g (tetralin, 135° C.) was obtained.

B. The polymer prepared as above in Part A was compression moulded into film at 100° C. Drawing was conducted at a temperature of 130° C. to a draw ratio of 18. The drawn polymer exhibited a denier of 59.4, a tenacity of 16.2 g/den, a modulus of 588 g/den and an elongation of 2.9%.

EXAMPLES 26-30

A. In a dry box 500 mg of dried Silicagel [surface area of 400 m²/g] was suspended in 260 ml of a 0.0008M solution of vanadium (IV) chloride in heptane. In order to convert the vanadium (IV) to vanadium (III), in accordance with the procedure of Chanzy et al., Polymer, 8, 567 (1967), supra, the solution was heated at the boiling point for 10 minutes, cooled, decanted and the catalyst residue washed three times with 200 ml of heptane and then suspended in 150 ml of heptane. In an atmosphere of argon gas, a dry pressure bottle was charged with 200 ml of a 0.015M solution of triisobutylaluminum in heptane. The solution was cooled to −40° C. and 50 ml of the suspension was added. The bottle was sealed and charged to 10 psig with ethylene. After 16 hours at −40° C. and 10 psig ethylene, the bottle was vented and the polymer formed therein recovered by filtration. The recovered polyethylene was washed in methanol/hydrochloric acid then with pure methanol and dried. Approximately 1.5 g of dry polyethylene having a heat of fusion of 194 J/g and a melting temperature of 140° C. (DSC at 10° C./minute) was obtained.

B. Polymer as prepared above in Part A was compression moulded into films at the temperatures indicated in Table IV where the properties of the molded polymers drawn at the temperatures reported and a draw ratio of 25:1 are also recorded.

TABLE IV

| Ex. | Molding Temperature (°C.) | Drawing Temperature (°C.) | Denier | Tenacity (g/den) | Modulus (g/den) | Elongation (%) |
|---|---|---|---|---|---|---|
| 26 | 100 | 130 | 17.1 | 18.5 | 773 | 2.5 |
| 27 | 100 | 130 | 17.1 | 19.6 | 871 | 2.4 |
| 28 | 100 | 130 | 13.5 | 21.8 | 779 | 3.1 |
| 29 | 100 | 115 | 360.0 | 21.6 | 541 | 5.1 |
| 30 | 100 | 115 | 396.0 | 22.0 | 549 | 5.3 |

EXAMPLES 31-33

A. Ethylene was polymerized as described in Part A of Examples 26-30, except that the polymerization was conducted at −20° C. for a period of two hours. The yield of dry polymer was 3.4 g. The dry polymer exhibited a heat of fusion of 209 Joules/gram, a melting point of 140° C. (DSC at 10° C./minute) and a viscosity of 24.3 dl/g (tetralin, 135° C.); MW $4.9 \times 10^6$.

B. Polymer prepared as above in Part A was compression moulded into films at 100° C. Strips of different widths, typically about 0.5 or 5 mm, were cut from the films. Properties of the polymeric films drawn at various temperatures to a draw ratio of 40:1 are reported in Table V.

TABLE V

| Ex. | Stretch Temperature (°C.) | Denier | Tenacity (g/den) | Modulus (g/den) | Elongation (%) |
|---|---|---|---|---|---|
| 31 | 130 | 22.5 | 28.8 | 1047 | 3.3 |
| 32 | 130 | 22.5 | 27.6 | 1003 | 3.1 |
| 33 | 115 | 130.5 | 29.4 | 890 | 4.3 |

COMPARATIVE EXPERIMENT C (outside the invention)

A. Ethylene was polymerized as described in Part A of Examples 26-30, except that the polymerization was carried out at 25° C. for a period of two hours. The yield of dry polymer was 10.5 g. The polymer had a heat of fusion of 200 Joules/gram, a melting point of 141° C. (DSC at 10° C./minute) and a viscosity of 24.6 dl/g (tetralin, 135° C.); MW $4.9 \times 10^6$.

B. The polymer of Part A of this Comparative Experiment C was compression moulded at 100° C. Strips of different widths, typically about 0.5 or 5 mm, were cut from the films and stretched at a temperature of 130° C. The mechanical properties of the drawn polymer were tenacity 13.5 g/den, modulus 451 g/den and elongation 3.2%.

EXAMPLES 34-37

A. Except as noted below, Part A of Examples 26-30 was repeated. Fumed silica (200 mg dried) was suspended in 50 ml of a vanadium (IV) chloride solution in heptane. The concentrations of the vanadium solutions used to prepare the catalysts are given in Table VI. The polymerization was carried out at a polymerization time of two hours and a temperature of 5° C.

B. The formed polyethylene from Part A (300 mg) was compression moulded at 110° C. at a pressure of 500 kg/cm² for five minutes to give transparent films. Shapes of a typical width of about 0.5 mm were cut from the films and stretched at a temperature of 122° C. to break.

TABLE VI

| Ex. | [Vanadium] | Yield | Hf [J/g] | Tm | Avg. Draw Ratio |
|---|---|---|---|---|---|
| 34 | 0.005 M | 24.8 g | 194 | 142° C. | 19 |
| 35 | 0.002 M | 11.7 g | 203 | 142° C. | 31 |
| 36 | 0.001 M | 4.7 g | 207 | 141° C. | 36 |
| 37 | 0.0005 M | 2.7 g | 198 | 141° C. | ≧40 |

This set of examples clearly illustrates the influence of the concentration of active sites on the catalyst surface on the maximum draw ratio. The higher the concentration, the smaller the distance between the growing polymer chains and the poorer the properties of the resulting polymer.

EXAMPLE 38

A. Catalyst was prepared as in Example 37 and the polymerization was carried out as in Part A of Examples 26-30 except that the polymerization was carried out at a temperature of 5° C. for a period of two hours.

B. The polymer of Part A was compression moulded at 100° C. under 500 kg/cm² pressure. Strips of polymer 0.5 mm wide were cut and stretched at 110° C. The results of these experiments are given in Table VII, along with those of Comparative Experiments D and E (both outside the invention).

TABLE VII

| Exp./Ex. | Ethylene Pressure | Yield | Hf(J/g) | Tm | Avg. Draw Ratio |
|---|---|---|---|---|---|
| D | 60 psig | 7.5 g | 199 | 143° C. | 12 |
| E | 30 psig | 5.4 g | 190 | 144° C. | 17 |
| 38 | 10 psig | 7.1 g | 191 | 143° C. | 20 |

These experiments and example illustrate the adverse effect of high ethylene pressures on the elongation (draw) properties of the compression moulded polymer.

COMPARATIVE EXPERIMENT F

A. In an atmosphere of argon gas, a dry pressure bottle was charged with 200 ml of a 0.005M solution of triisobutylaluminum in heptane. The solution was cooled to $-20°$ C. and 1 ml of the cooled suspension of a titanium catalyst [$8 \times 10^{-6}$ mole of titanium] prepared in the manner described in Example 6 of European Patent Application Publication No. 0 105 728 in 49 ml of heptane was added. The bottle was sealed and charged with 10 psig of ethylene. After two hours at $-20°$ C. and 10 psig ethylene the bottle was vented and the polymer was recovered by filtration. The crude polyethylene was washed in methanol/hydrochloric acid followed by a washing with pure methanol. The yield of dry polymer was 1.1 g. The polyethylene had a heat of fusion of 197 Joules/gram and a melting temperature of 141° C.

B. The polyethylene prepared in Part A of this experiment was pressed at 100° C. to a coherent film, but it could not be stretched to a draw ratio greater than 5 at 100° C.

This experiment shows that highly active catalyst systems have an adverse effect on the maximum draw ratio of the pressed polymer.

We claim:

1. Process for producing shaped structures having a tenacity of greater than 15 g/den and an initial modulus of greater than 500 g/den, said process comprising drawing at 60°-145° C. a substantially linear, highly cyrstalline, neither melted nor dissolved polyolefin having a molecular weight greater than 1,000,000 and selected from polyethylene, polypropylene and copolymers of ethylene and 0.1-2.0 mol % propylene.

2. Process of claim 1 wherein the polyolefin is polyethylene.

3. Process of claim 1 wherein the shaped structure is a film, tape, filament or fiber.

4. Process of claim 1 wherein the molecular weight is at least 2,000,000.

5. Process of claim 4 wherein the molecular weight is at least 5,000,000.

* * * * *

UNITED STATES PATENT AND TRADEMARK OFFICE
CERTIFICATE OF CORRECTION

PATENT NO.   : 4,769,433
DATED        : September 6, 1988
INVENTOR(S)  : Chanzy et al.

It is certified that error appears in the above—identified patent and that said Letters Patent is hereby corrected as shown below:

Column 8, line 15 - strike "Table I" and replace with "Table II".

Inventors - strike "Bruno Rotzinger, Untersiggenthal, Switzerland".

Signed and Sealed this

Thirtieth Day of May, 1989

Attest:

DONALD J. QUIGG

*Attesting Officer*  Commissioner of Patents and Trademarks